United States Patent
Tanaka (10) Patent No.: US 7,619,509 B2
(45) Date of Patent: Nov. 17, 2009

(54) TIRE MONITORING SYSTEM

(75) Inventor: Akitomo Tanaka, Kasugai (JP)

(73) Assignee: OMRON Corporation, Kyoto (JP)

( * ) Notice: Subject to any disclaimer, the term of this patent is extended or adjusted under 35 U.S.C. 154(b) by 345 days.

(21) Appl. No.: 11/701,669

(22) Filed: Feb. 2, 2007

(65) Prior Publication Data
US 2007/0182533 A1 Aug. 9, 2007

(30) Foreign Application Priority Data
Feb. 3, 2006 (JP) ............................ 2006-027342

(51) Int. Cl.
*B60C 23/00* (2006.01)
(52) U.S. Cl. .................. 340/442; 340/447; 73/146.2
(58) Field of Classification Search .......... 340/442, 340/447; 73/146.2, 146.8, 146
See application file for complete search history.

(56) References Cited

U.S. PATENT DOCUMENTS

| | | | | |
|---|---|---|---|---|
| 5,826,210 | A * | 10/1998 | Izumi et al. ............... | 73/146.2 |
| 6,160,474 | A * | 12/2000 | Tsunetomi et al. .......... | 340/442 |
| 7,032,441 | B2 * | 4/2006 | Kanatani et al. ............ | 73/146 |
| 7,212,106 | B2 * | 5/2007 | Katou ....................... | 340/447 |
| 2006/0244581 | A1 * | 11/2006 | Breed et al. ............... | 340/447 |
| 2008/0303652 | A1 * | 12/2008 | Shigihara et al. ........... | 340/447 |

FOREIGN PATENT DOCUMENTS

| | | |
|---|---|---|
| JP | 2000 255229 A | 9/2000 |
| WO | 2005/077681 A1 | 8/2005 |

OTHER PUBLICATIONS

Extended European Search Report for Application No. 07101163.9-2425, mailed on Feb. 25, 2009 (4 pages).
Patent Abstracts of Japan for Japanese Publication No. 2000-255229, publication date Sep. 19, 2000 (1 page).

* cited by examiner

*Primary Examiner*—John A Tweel, Jr.
(74) *Attorney, Agent, or Firm*—Osha • Liang LLP (57) ABSTRACT

In a tire monitoring system for sufficiently reducing the possibility of cross talk generation of a request signal individually transmitted from a vehicle body side controller to each sensor unit, a vehicle body side antenna for transmitting the request signal and a tire side antenna for receiving the request signal are set to a coil antenna. The vehicle body side antenna is arranged above each tire such that a coil axis of the tire side antenna is set to be parallel to a rotating axis of each of tires, and a coil axis of the vehicle body side antenna is inclined with respect to the rotating axis. An inclination direction of the coil axis of the vehicle body side antenna is set so as to incline the coil axis of the vehicle body side antenna on a transversal outside of the vehicle toward a downward direction.

4 Claims, 5 Drawing Sheets

MEASURING DATA

| TPS ANGLE | 0 DEGREE REFERENCE → 70 DEGREES RELATIVE VALUE (dB) | |
|---|---|---|
| | OBJECT WHEEL | NON-OBJECT WHEEL |
| 0 | 0.37 | -7.52 |
| 10 | 1.00 | -7.26 |
| 20 | 1.01 | -8.40 |
| 30 | 1.01 | -7.39 |
| 40 | 1.14 | -7.42 |
| 50 | 1.11 | -8.60 |
| 60 | 1.12 | -10.65 |
| 70 | 1.01 | -9.82 |
| 80 | 1.06 | -11.00 |
| 90 | 1.76 | -13.02 |
| 100 | 1.26 | -14.25 |
| 110 | 1.90 | -16.15 |
| 120 | 1.65 | -20.19 |
| 130 | 2.45 | -21.71 |
| 140 | 3.04 | -21.33 |
| 150 | 2.72 | -20.86 |
| 160 | 3.93 | -20.05 |
| 170 | 4.77 | -19.36 |
| 180 | 5.51 | -19.19 |

TIRE MONITORING SYSTEM

BACKGROUND OF THE INVENTION

1. Field of the Invention

The present invention relates to a system for monitoring tire pressure, etc. for a vehicle such as a four-wheel automobile, etc.

2. Description of Related Art

In recent years, there is a tire pressure monitoring system (TPMS) as a system for monitoring a state of a tire in a vehicle such as a four-wheel automobile, etc. A system for monitoring temperature, distortion, a rotation number, acceleration, etc. in addition to pressure is also devised.

For example, TPMS has a vehicle body side controller able to transmit a wireless signal through an antenna for vehicle body side signal transmission respectively arranged near each tire of the vehicle. TPMS also has a sensor unit arranged in each tire of the vehicle and measuring the pressure of each tire and able to transmit its measuring result as a wireless signal. The above vehicle body side controller transmits a request signal (trigger signal) to the sensor unit of the corresponding tire from the antenna for vehicle body side signal transmission in a specific portion in predetermined timing. The above sensor unit receiving this request signal transmits an answer signal including the above measuring result to the above vehicle body side controller. The above vehicle body side controller receiving this answer signal reads the above measuring result. For example, when the measuring result shows an abnormal pressure, the vehicle body side controller executes control for outputting an alarm.

As the above TPMS, there is also a one-direction communication system for periodically transmitting the wireless signal including the measuring result from e.g., the sensor unit of the tire without arranging the antenna for vehicle body side signal transmission (an antenna constituting an initiator) at every tire. However, in this case, it is impossible for the vehicle body side controller to judge whether it is the measuring result of the tire in which position (e.g., a front wheel or a rear wheel and a left-hand side or a right-hand side in the case of a four-wheel vehicle) by changing the position of the tire in accordance with tire rotation. Therefore, for example, there is a disadvantage in that information as to whether the pressure abnormality is generated in the tire of which position cannot be notified to a vehicle user.

In contrast to this, as mentioned above, if it is set to a bidirectional communication system at every tire for arranging the antenna for vehicle body side signal transmission at every tire, and separately transmitting the request signal every tire and separately receiving the measuring result from the sensor unit of each tire as the answer signal with respect to this request signal, it is possible for the vehicle body side controller to judge whether it is the measuring result of the tire of which position.

When a cross talk in which the request signal transmitted to the sensor unit of a specific tire is also received in the sensor unit of another tire is generated in the above bidirectional communication system at every tire, it is impossible to finally discriminate the above tire position. Therefore, a communication range of the request signal from the antenna for vehicle body side signal transmission should be naturally limited to only a narrow range near the corresponding specific tire, and a transmitting output of the above request signal is also naturally limited.

However, on the other hand, the tire is rotated by running the vehicle, and the position of an antenna for signal reception in the sensor unit is also rotated and moved in accordance with the rotation of the tire. Therefore, the position and posture of the antenna for signal reception in the sensor unit of the tire side are always changed, and it becomes difficult to receive the above request signal in accordance with the rotating position of the tire. When the transmitting output of the above request signal is weak, there is a fear that the above request signal cannot be received and no communication can be performed.

Therefore, a construction for conforming each of directivities of the antenna for vehicle body side signal transmission (trigger signal transmitting means) and the antenna for signal reception of the tire side (trigger signal receiving means) to a rotating axis direction of the tire is conventionally proposed as can be seen in JP-A-2005-1498 (Patent Document 1) in the above bidirectional communication system every tire. When the directivities of the antenna for vehicle body side signal transmission and the antenna for signal reception of the tire side are conformed to the rotating axis direction of the tire, no direction of the directivity of the antenna for signal reception is changed even when the tire is rotated. Furthermore, the direction of the directivity of the antenna for signal reception is always conformed to the direction of the directivity of the antenna for vehicle body side signal transmission. Accordingly, the possibility that no communication can be performed as mentioned above is reduced.

However, when the above conventional construction (the construction for setting all the directivities of the respective antennas to the tire rotating axis direction) is set, it is impossible to sufficiently reduce the possibility that the cross talk in which the request signal is also received in the sensor unit of another tire is generated. Further, a problem exists in that this cross talk is easily generated on the contrary. The reasons for this are as follows. In the case of the above conventional construction, the directions of the directivities of the respective antennas (the antenna for vehicle body side signal transmission and the antenna for signal reception of the tire side) are conformed with respect to all the tires. Therefore, in the case of a vehicle in which the tires are mounted on both transversal sides of a four-wheel automobile, etc. so as to form a pair, it is easy to generate the cross talk in which the request signal transmitted to the sensor unit of the tire of e.g., a front wheel left-hand side is also received in the sensor unit of the tire of a front wheel right-hand side.

SUMMARY OF THE INVENTION

Therefore, an object of the present invention is to provide a tire monitoring system such as a tire monitoring system (TPMS) of the vehicle for mounting the tires on both the transversal sides so as to form a pair, and adopting the bidirectional communication system at every tire, and sufficiently reducing the possibility of generation of the above cross talk.

A tire monitoring system of the present invention comprises a vehicle body side controller able to transmit a wireless signal to each tire through a vehicle body side antenna arranged near each tire in a vehicle in which tires are mounted on both transversal sides orthogonal to a running direction so as to form a pair; and a sensor unit arranged in each tire and measuring a state of each tire and able to transmit information based on its measuring result as a wireless signal; wherein the vehicle body side controller respectively transmits a request signal to each sensor unit through each vehicle body side antenna, and each sensor unit receiving this request signal through a tire side antenna arranged in each tire can respectively transmit an answer signal including information including the measuring result, or information relative to a proper code given to each sensor unit, etc. to the vehicle body side controller;

the vehicle body side antenna and the tire side antenna are constructed by a coil antenna;

the tire side antenna is arranged in the tire such that a coil axis of the tire side antenna approximately becomes parallel to a rotating axis of each tire; and the vehicle body side antenna is arranged near each tire such that the coil axis of the vehicle body side antenna does not become parallel to the rotating axis of each tire, but becomes perpendicular or is inclined with respect to the rotating axis of each tire.

Here, the "request signal" does not necessarily include data requiring a reply from the sensor unit, and it is sufficient to a signal forming a cause for making the reply of an answer signal by the sensor unit in accordance with this request signal. For example, it may be also set to a mode in which a wake-up signal for starting the sensor unit attaining an electric power saving mode and a so-called standby state (sleep state) to a normal operating mode is also the above request signal.

Further, a mode for transmitting electric power to the sensor unit by the "request signal" may be also set.

Further, the "vehicle" includes a riding conveyance (e.g., a compact airplane, etc.) equal to a general vehicle in addition to the general vehicle such as a four-wheel automobile, etc. For example, since there is also a tire for departure and arrival in the compact airplane, the present invention can be applied to the compact airplane. Further, the present invention may be also applied to a two-wheel barrow having a pair of tires on the left-hand side and the right-hand side.

In the tire monitoring system of the present invention, the possibility of generation of the above cross talk is greatly reduced.

The reasons for this are as follows. A magnetic field generated from the vehicle body side antenna is greatly inclined with respect to the coil axis of the tire side antenna of another tire forming a pair not to be communicated. Therefore, a magnetic flux number passing the coil of the tire side antenna of the tire to be communicated is sufficiently secured. On the other hand, a magnetic flux number passing the coil of the tire side antenna of another tire not to be communicated is greatly reduced. Accordingly, a signal receiving level using the tire side antenna of another tire forming a pair is greatly reduced, and the possibility of generation of the above cross talk is greatly reduced.

Next, in a preferable mode of the tire monitoring system of the present invention, the vehicle body side antenna is arranged above each tire so as to incline the coil axis of the vehicle body side antenna with respect to the rotating axis of each tire; and an inclination direction of the coil axis of the vehicle body side antenna is set so as to incline the coil axis of the vehicle body side antenna on a transversal outside of the vehicle toward a downward direction.

In this case, for example, it is sufficient to attach the vehicle body side antenna along the inner face of a tire house. Accordingly, there is an advantage in that its attachment is facilitated.

Further, in a separate preferable mode of the tire monitoring system of the present invention, a central position of the vehicle body side antenna is arranged outside a central position of the tire side antenna in a transversal direction of the vehicle.

In this case, the vehicle body side antenna is arranged in a position separated on the transversal outside. Accordingly, the signal receiving level using the tire side antenna of another tire forming a pair is further reduced by attenuation due to the separated distance. Therefore, the possibility of generation of the above cross talk is further reduced.

When at least the above two preferable modes are adopted, as verified by an experiment described later and shown in FIGS. 3A and 3B, the signal receiving level using the tire side antenna of the tire to be communicated is increased on the contrary in comparison with a case in which the coil axis of the vehicle body side antenna is parallel to the tire rotating axis. Thus, the above communication disability and the possibility of generation of the cross talk are more reduced.

In accordance with the tire monitoring system of the present invention, the possibility of generation of the above cross talk is sufficiently reduced.

DESCRIPTION OF PREFERRED EMBODIMENTS

One example of an embodiment of the present invention will next be explained on the basis of the drawings.

Figure 1:
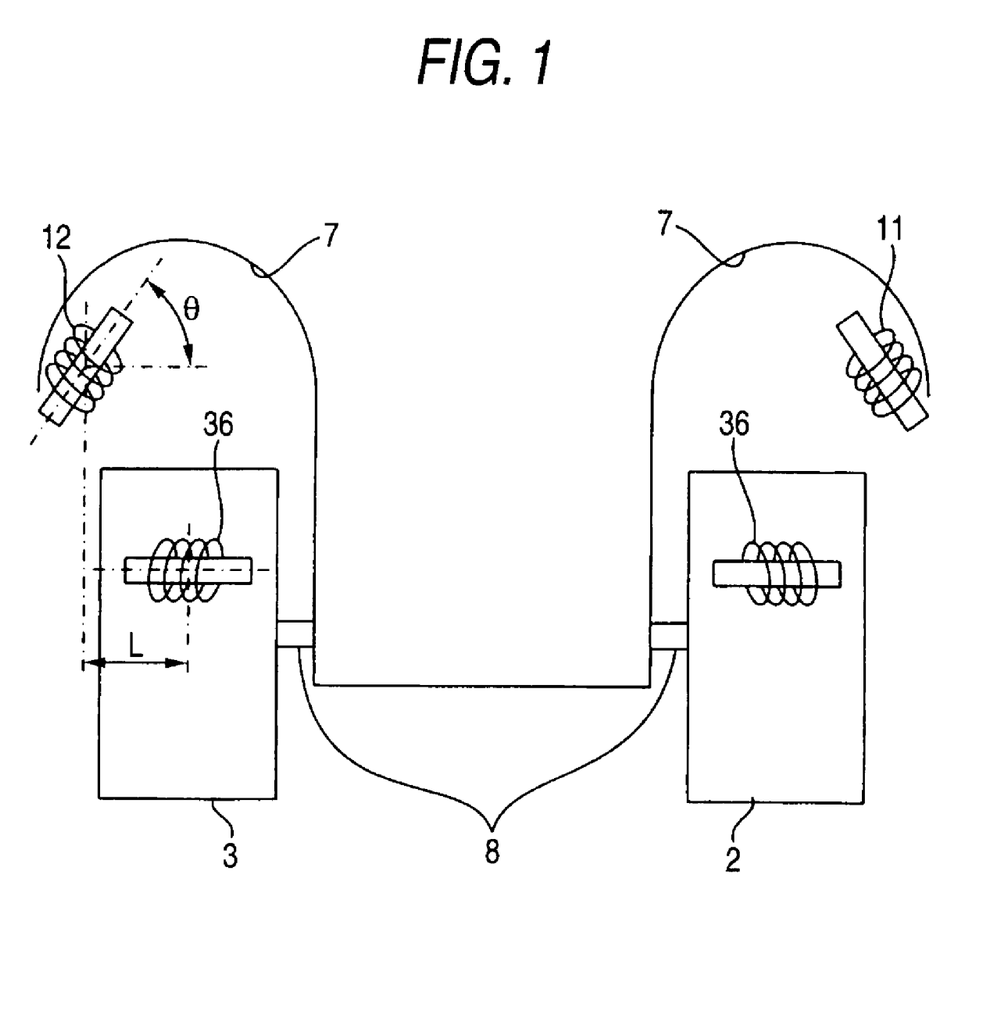
FIG. 1 is a view for explaining the arrangement of an LF antenna of a tire monitoring system.
Figure 2A:
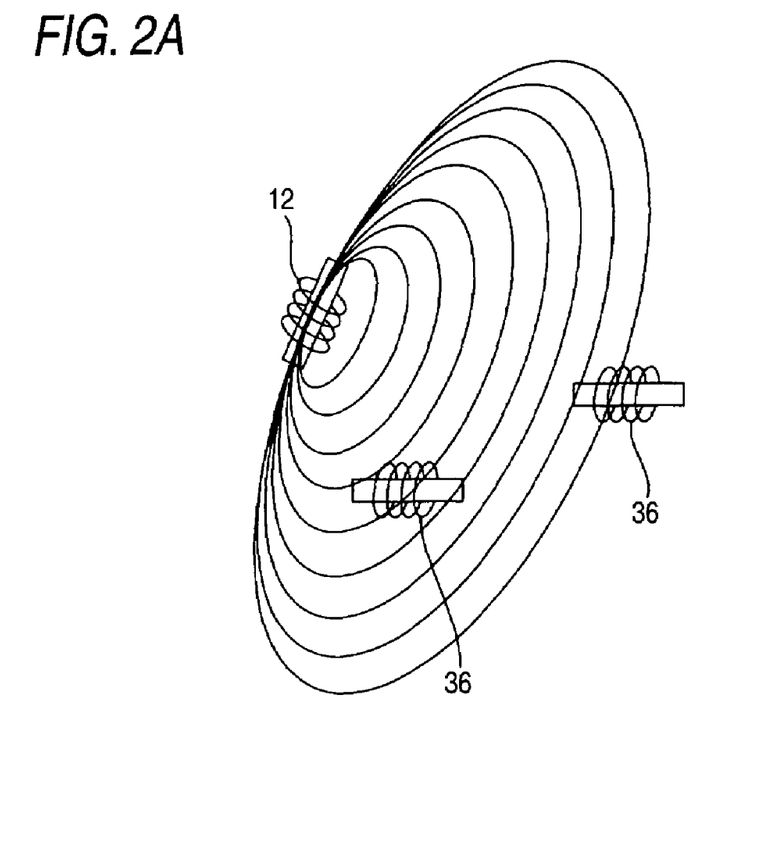
FIG. 2A is a view for explaining an operation of the present invention.
Figure 2B:
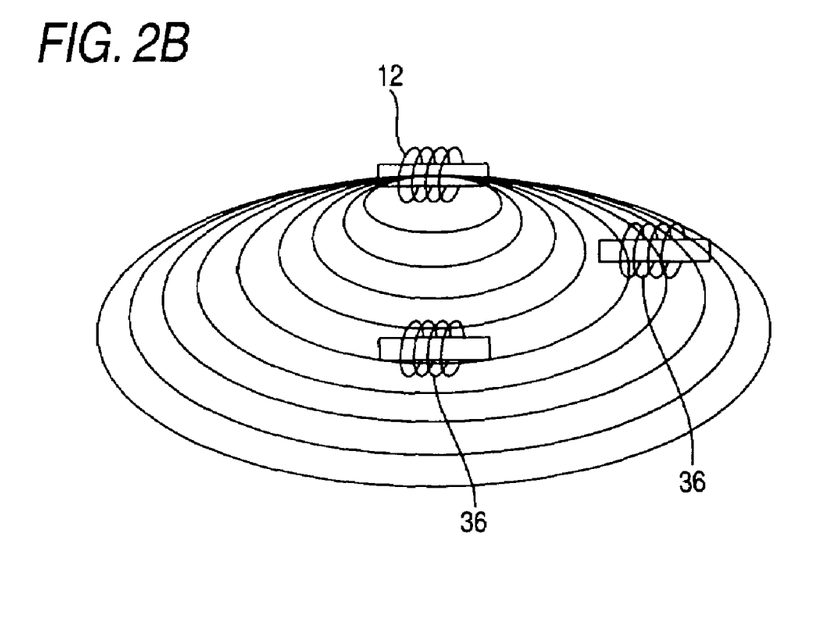
FIG. 2B is a view for explaining an operation of a comparison example.
Figure 4:
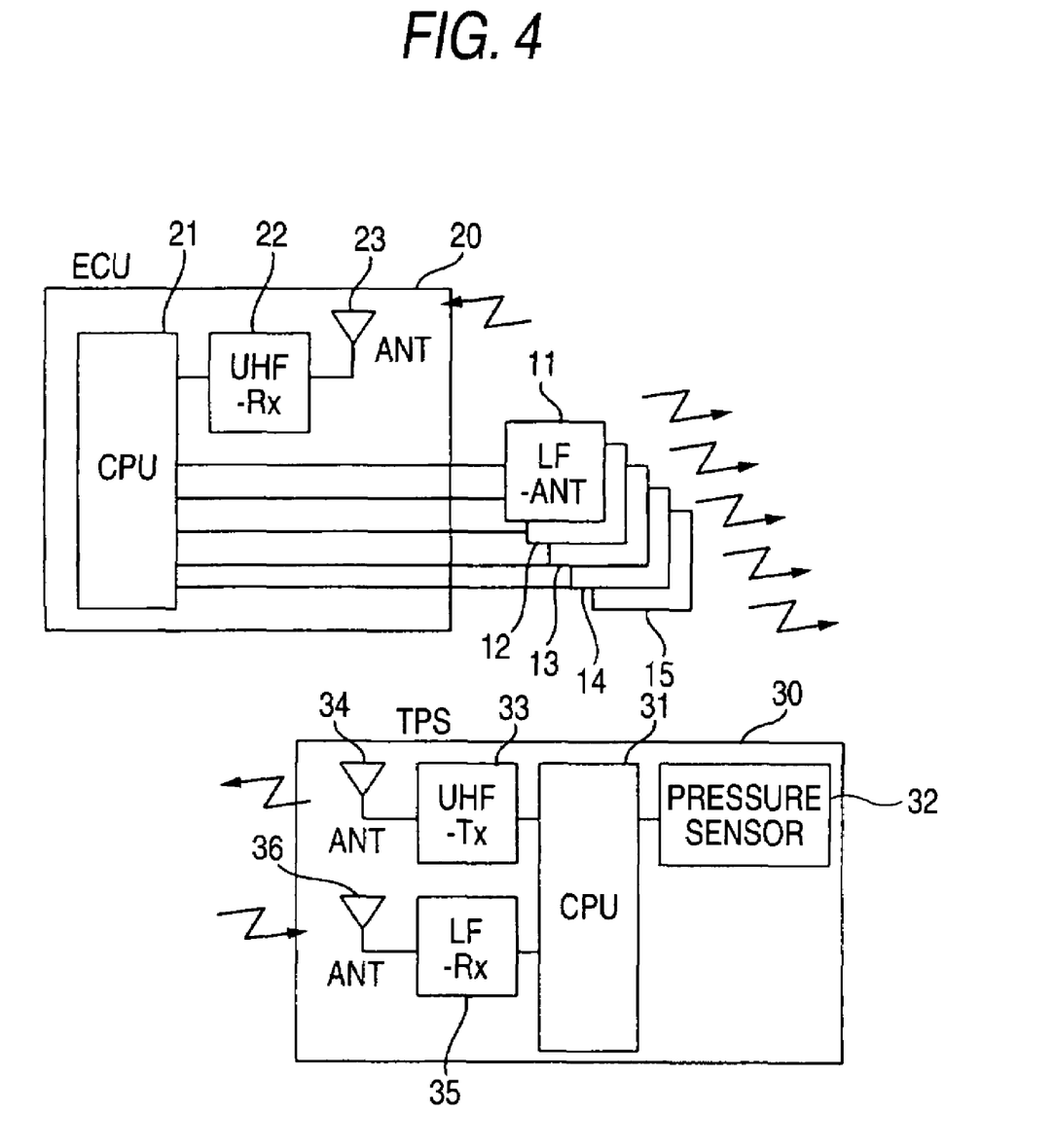
FIG. 4 is a view for explaining the construction of the tire monitoring system.
Figure 5:
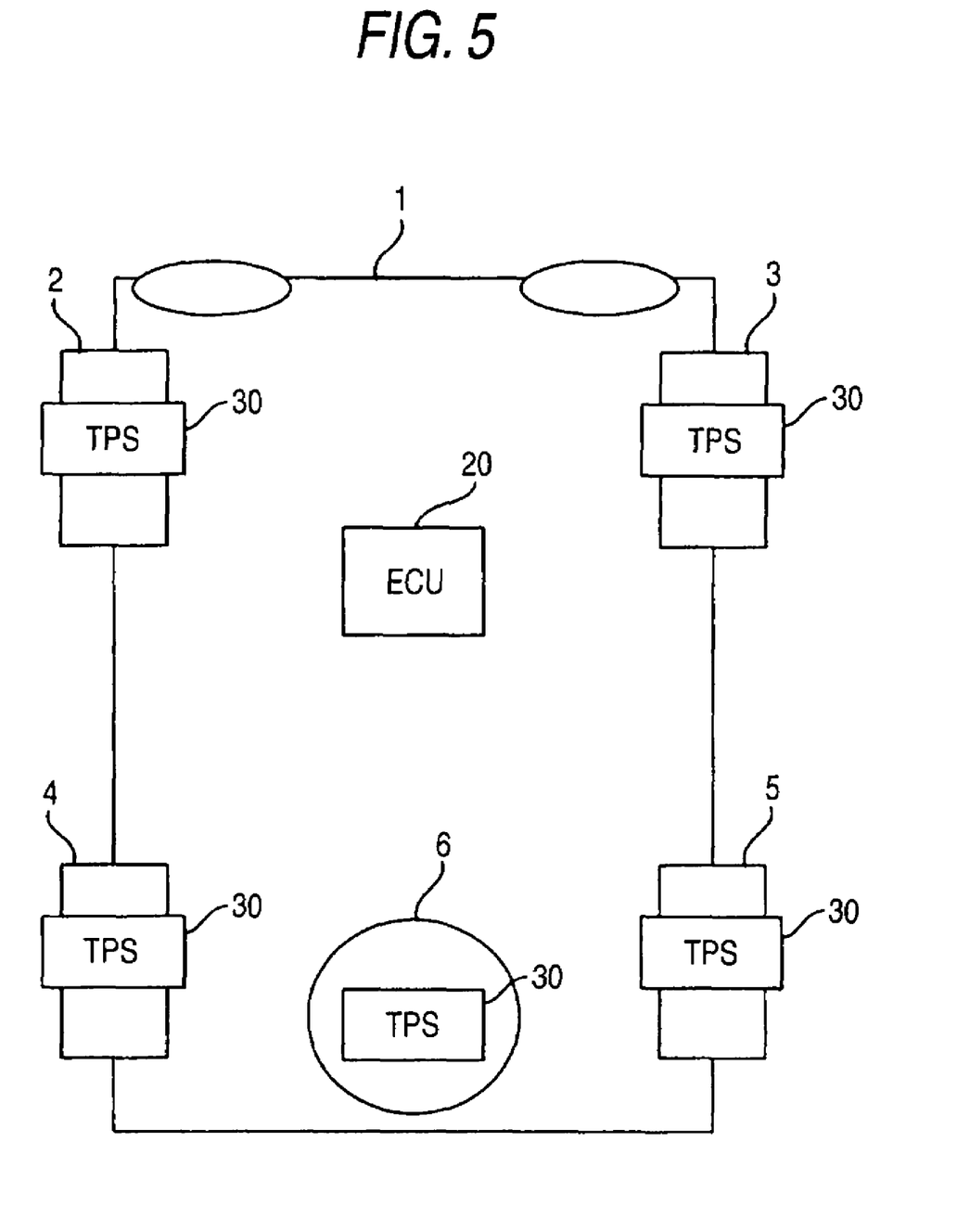
FIG. 5 is a view for explaining the arrangement of a main constructional element in a vehicle of this system.

FIG. 4 is a view for explaining the construction of a tire monitoring system of this example. FIG. 5 is a view for explaining the arrangement of a main constructional element in a vehicle of this system. FIG. 1 is a view for explaining an arrangement of each antenna of this system (a view in which the vehicle is seen from a front face). FIG. 2A is a view for explaining an operation of this example. FIG. 2B is a view for explaining an operation of a comparison example.

In this case, the vehicle 1 is a four-wheel automobile shown in FIG. 5. As shown in FIG. 4, this system has antennas 11 to 15 for vehicle body side signal transmission, a vehicle body side controller (ECU) 20 and a sensor unit (TPS) 30.

Here, the antennas 11 to 15 for vehicle body side signal transmission are arranged in positions (a tire house of each tire, or a trunk lower portion for storing a tire 6 for exchange, etc.) near respective tires 2 to 6 (including the spare tire 6 for exchange) shown in FIGS. 2A and 2B. The antennas 11 to 15 for vehicle body side signal transmission are a coil antenna (e.g., ferrite bar antenna) for transmitting a request signal (an LF wave, e.g., 125 kHz) to the sensor unit 30 of each of the tires 2 to 6 by control of the vehicle body side controller 20. The LF wave is advantageous when a communication range is narrowly limited to e.g., about 1 m. When the communication range is a range until several kilometers ahead, it is provided by a vicinity electromagnetic field. It is possible to use a communication system with a magnetic field generated near the antenna as a transmission medium, e.g., a communication system (electromagnetic induction system) utilized in a non-contact IC card. Further, the coil antenna is suitable for the above communication system.

Further, the antennas 11 to 15 for vehicle body side signal transmission are normally molded by resin, and respectively have about 2 to 5 cm in longitudinal and transversal thicknesses.

The vehicle body side controller 20 is a main controller of TPMS arranged within a predetermined control box within a vehicle body. The vehicle body side controller 20 has a control circuit 21 constructed by a micro computer (hereinafter called micon), a communication circuit of a wireless signal (a signal transmitting circuit of the LF wave and a signal receiving circuit 22 of a UHF wave), and a signal receiving antenna (a signal receiving antenna 23 of the UHF wave). In this case, the control circuit 21 functions as the signal transmitting circuit of the LF wave, but the signal transmitting circuit of the LF wave may be also arranged separately from the control circuit 21.

For example, this vehicle body side controller 20 periodically sequentially executes pressure monitoring processing of each tire (described later in detail). For example, when there is a tire lying within no proper range in pressure, the vehicle body side controller 20 performs basic control processing as TPMS in which control for outputting an alarm (an alarm using a sound, light and character display) showing its tire position and a pressure abnormality is executed, and the alarm is notified to a driver.

In the control circuit 21 of this vehicle body side controller 20, for example, consumed electric power is restrained at its required minimum by starting the control circuit 21 only when the control circuit 21 attains a state (e.g., an engine operating time, etc.) requiring the tire pressure monitoring.

Next, the sensor unit 30 is arranged within each tire (e.g., the position of a valve). The sensor unit 30 has a control circuit 31 (e.g., a circuit constructed by a micro computer), a pressure sensor 32 for measuring the pressure of each tire, a signal transmitting circuit 33 and an antenna 34 for signal transmission for transmitting pressure data measured by this sensor as a wireless signal (UHF wave), and a signal receiving circuit 35 and a signal receiving antenna 36 for receiving the above request signal.

Here, the control circuit 31 of the sensor unit 30 steadily attains a standby state as an electric power saving mode, and is constructed so as to be suitably switched from this standby state to a normal mode (a starting state which is no standby state) and be operated.

Further, the signal receiving antenna 36 of the sensor unit 30 is a coil antenna (e.g., ferrite bar antenna) suitable for the above communication system (e.g., the electromagnetic induction system). Further, the sensor unit 30 (including the signal receiving antenna 36) is normally molded by resin, and respectively has about 1 to 3 cm in longitudinal and transversal thicknesses.

Next, a characteristic arrangement of the antenna for transmitting and receiving the request signal will be explained by FIG. 1.

As shown in FIG. 1, the signal receiving antenna 36 (tire side antenna) of the sensor unit 30 is arranged such that its coil axis becomes parallel to a rotating axis 8 of each tire. The signal receiving antenna 36 is fixed to a wheel of each tire.

In contrast to this, as shown in FIG. 1, antennas 11 to 14 (vehicle body side antennas) for vehicle body side signal transmission corresponding to the respective tires 2 to 5 except for the tire 6 for exchange are attached to the tire house 7 of the vehicle in a fixing state by screw fastening, etc. Namely, the antennas 11 to 14 for vehicle body side signal transmission are arranged above the respective tires such that its coil axis is inclined with respect to the rotating axis 8 of each tire. The inclination directions of the coil axes of the antennas 11 to 14 for vehicle body side signal transmission are set such that the coil axes of the antennas 11 to 14 for vehicle body side signal transmission are inclined on a transversal outside of the vehicle toward a downward direction. In accordance with such inclination directions, for example, it is sufficient to attach the antennas 11 to 14 for vehicle body side signal transmission along an inner face of the tire house 7. Accordingly, there is an advantage in that this attachment (attachment after an interference with a mechanism such as the tire, a suspension, etc. is avoided) is facilitated.

For example, an inclination angle θ (an angle with respect to the direction of the rotating axis 8 shown in FIG. 1) of the coil axis of each of the antennas 11 to 14 for vehicle body side signal transmission is preferably set to about 70 degrees.

Further, as shown in FIG. 1, central positions of the antennas 11 to 14 for vehicle body side signal transmission are preferably arranged so as to be separated outwardly from the central position of the signal receiving antenna 36 by a distance L in the transversal direction of the vehicle. Here, the distance L is not particularly limited, but should be set as largely as possible to prevent the cross talk.

Next, the pressure monitoring processing executed by the control circuit 21 of the vehicle body side controller 20 will be explained.

For example, the control circuit 21 of the vehicle body side controller 20 periodically executes the pressure monitoring processing with respect to each tire after the control circuit 21 is started.

In this pressure monitoring processing, it is first judged whether it is predetermined detection timing or not. This detection timing means timing in which the pressure of the tire of a detecting object is read and should be confirmed. For example, the detection timing is timing in which the sequential order of the tire of the detecting object is turned and has come when the pressure is sequentially confirmed as in the order of a front left-hand side tire 2, a front right-hand side tire 3, a rear left-hand side tire 4, a rear right-hand side tire 5 and a spare tire 6.

If it is the detection timing, the next request signal transmitting step is executed. In contrast to this, if it is no detection timing, the processing is terminated.

In the request signal transmitting step, a prescribed request signal is transmitted from the antenna for vehicle body side signal transmission with respect to the tire of the detecting object by the above communication system.

Next, when it has passed the above request signal transmitting step, it is judged whether a normal answer signal is received or not during a predetermined signal reception waiting time in the next signal receiving step. More particularly, it is judged whether a signal including a code conformed to an ID code proper to the vehicle body stored in advance in a predetermined portion is received through the antenna 23 for signal reception or not. If such a normal answer signal is received during the predetermined signal reception waiting time, it proceeds to the next data reading step. In contrast to this, when the above signal reception waiting time has passed without receiving the normal answer signal, for example, an alarm is outputted for caution's sake.

Next, in the data reading step, measuring data of the pressure included in the received answer signal are read, and it is judged whether these measuring data are normal or not (e.g., whether the pressure lies in a proper range or not). If the measuring data are normal, the processing is terminated. In contrast to this, if the measuring data are not normal, it proceeds to an abnormality annunciation step. In the pressure judgment made here, it may be also executed whether the pressure is too high or not. Further, it may be also judged whether the pressure is a little lowered (a preferable state of pressure supplementation of the tire), etc. even when the pressure lies in the proper range.

In the abnormality annunciation step, the processing is terminated by executing control for outputting an alarm (an alarm using a sound, light and character display) showing that the tire of the detecting object is abnormal in pressure (or the pressure is a little lowered as mentioned above, or the value of the pressure itself, etc.).

When no normal answer signal can be received in the signal receiving step, a separate alarm showing that an abnormality unable to communicate with the sensor unit of the tire as the detecting object is generated may be also outputted.

Next, pressure data signal transmission processing executed by the control circuit 31 of the sensor unit 30 will be explained.

Namely, for example, when a signal (before demodulation) of prescribed intensity or more is received at a prescribed frequency corresponding to the request signal, it proceeds to the normal mode and signal reception processing of this signal is executed. It is first judged whether this signal is a normal request signal or not. Concretely, the received signal (a binary data series after demodulation) is analyzed, and it is judged whether the same data as the ID code proper to the vehicle body stored in advance are included in a predetermined portion (e.g., an ID portion) of the received signal or not. If it is affirmative, it is judged that it is the normal request signal.

If it is judged that it is the normal request signal in the above judgment processing, an answer signal including the above ID code and newest pressure data of the mounted tire is transmitted by a predetermined time number. In contrast to this, when it is not judged that it is the normal request signal in the above judgment processing, and after the transmission of the above answer signal is terminated, it is returned to a standby state, and it waits for a signal re-input.

In accordance with the system of this example explained above, the request signal and the answer signal are transmitted and received between the sensor unit 30 of each tire and the vehicle body side controller 20 in the predetermined detection timing. When no answer signal can be received by the vehicle body side controller 20, or the pressure measuring data included in the received answer signal are abnormal, an alarm showing that the tire of a detecting object is abnormal in pressure is outputted. Thus, a basic function as TPMS of the bidirectional communication system every tire is realized.

Furthermore, since respective antennas 11 to 14, 36 for transmitting and receiving the request signal are arranged as shown in FIG. 1, the above communication disability and the possibility of generation of cross talk are greatly reduced.

The reasons for this are as follows. For example, a magnetic field generated from the antenna 12 for vehicle body side signal transmission is inclined as shown in FIG. 2A. Therefore, a magnetic flux number passing a coil of the signal receiving antenna 36 (signal receiving antenna 36 of the left-hand side in FIG. 2A) of the tire 3 to be communicated is sufficiently secured. On the other hand, a magnetic flux number passing a coil of the signal receiving antenna 36 (signal receiving antenna 36 of the right-hand side in FIG. 2A) of another tire 2 not to be communicated is greatly reduced. This is because the coil axis of the signal receiving antenna 36 of another tire 2 not to be communicated becomes close to a direction perpendicular to the direction of the magnetic flux. Accordingly, a signal receiving level using the signal receiving antenna 36 of another tire 2 forming a pair is greatly reduced, and the possibility of generation of the above cross talk is greatly reduced.

In particular, in the case of this example, the antennas 11 to 14 for vehicle body side signal transmission are arranged in positions separated by the above distance L on the transversal outside. Accordingly, the signal receiving level using the signal receiving antenna 36 of another tire forming a pair is further reduced by attenuation due to the distance, and the possibility of generation of the above cross talk is further reduced.

FIG. 2B is a view showing a state of the magnetic field when all the respective antennas 11 to 14, 36 for transmitting and receiving the request signal are arranged in parallel with the rotating axis 8 (comparison example). In this case, the magnetic flux number passing the coil of the signal receiving antenna 36 (signal receiving antenna 36 of the left-hand side in FIG. 2B) of the tire 3 to be communicated is secured. On the other hand, the magnetic flux number passing the coil of the signal receiving antenna 36 (signal receiving antenna 36 of the right-hand side in FIG. 2B) of another tire 2 not to be communicated is also considerably generated. Therefore, for example, it is easy to generate the cross talk in which the request signal transmitted to the sensor unit of the tire 2 of the front wheel left-hand side is also received in the sensor unit of the tire 3 of the front wheel right-hand side.

A vertical position of the signal receiving antenna 36 is changed in accordance with a rotating position of the tire. However, FIGS. 2A and 2B illustrate a case in which the signal receiving antenna 36 (the signal receiving antenna of the tire 2) of the right-hand side within these figures is located slightly upward by rotating the tire in comparison with the signal receiving antenna 36 (the signal receiving antenna of the tire 3) of the left-hand side within these figures.

It is not necessarily impossible to avoid the cross talk explained in the above FIG. 2B by finely adjusting and setting the specification of transmitting outputs of the antennas 11 to 14 for vehicle body side signal transmission, etc. in accordance with a vehicle kind. However, in this case, there is a disadvantage in that the specification of the system is different for every vehicle kind, and no common use formation can be performed. However, in accordance with the construction of the present invention shown in FIG. 2A, the cross talk can be easily avoided even when the specification of the transmitting outputs of the antennas 11 to 14 for vehicle body side signal transmission, etc. is set with a considerable degree of freedom. Accordingly, there is an advantage in that the specification of the system can be commonly used irrespective of a difference in vehicle kind.

Figure 3A:
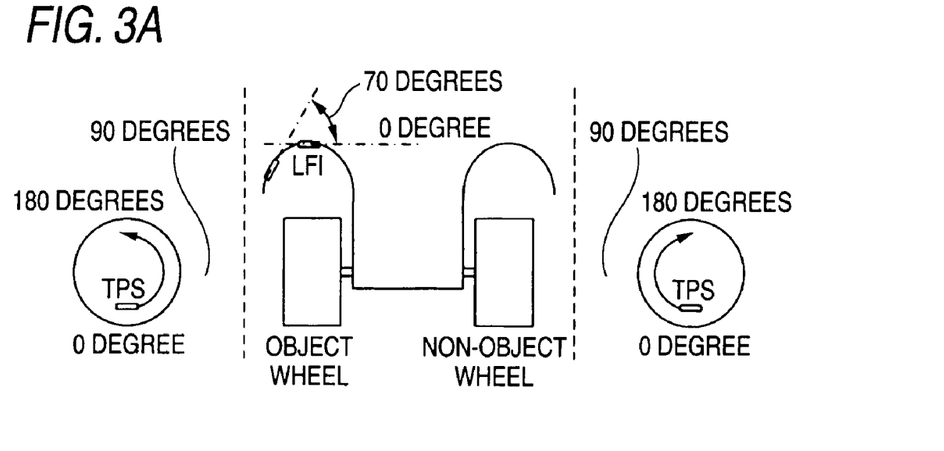
FIG. 3A is a view for explaining an experiment for verifying the operation of the present invention.
Figure 3B:
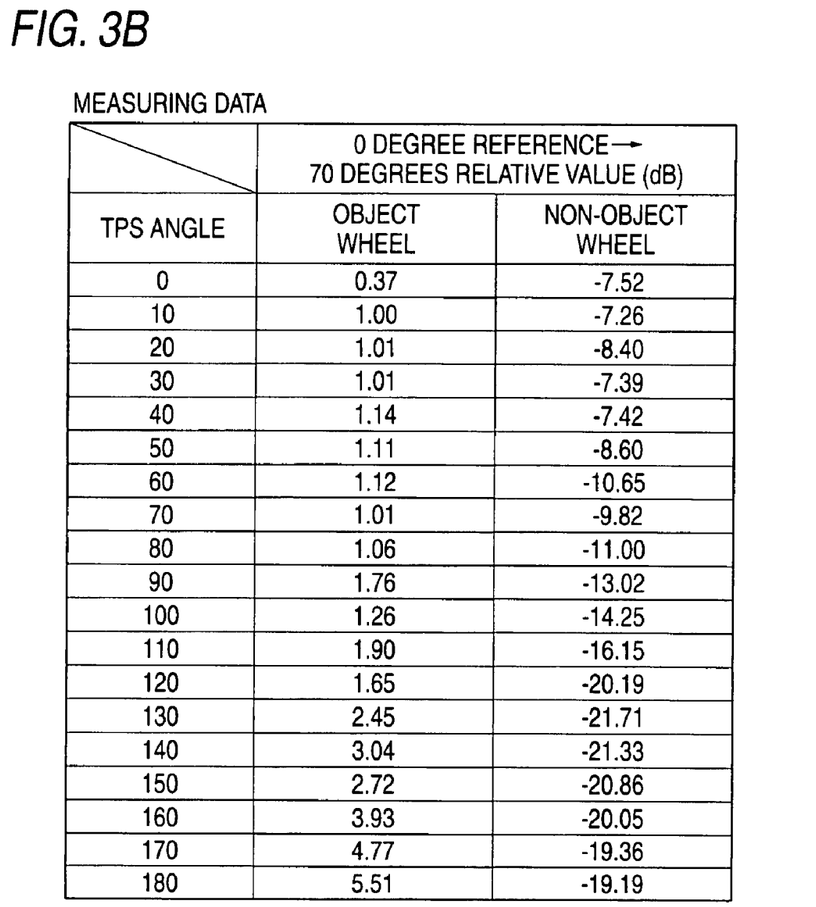
FIG. 3B is a view showing a result of this experiment.

Next, FIG. 3A is a view for explaining an experiment for verifying the operation of this example. FIG. 3B is a view showing a result of this experiment. In this experiment, the signal receiving level of the request signal (LF wave) in the signal receiving antennas 36 (antenna of TPS) of an object wheel (a tire to be communicated) and a non-object wheel (a tire forming a pair not to be communicated) is measured every rotation angle of the tire by changing attachment positions and attachment angles of the antennas 11 to 14 for vehicle body side signal transmission (LFI, i.e., initiator of the LF wave) along the inner face of the tire house 7. As shown in FIG. 3A, the measurement is made when the attachment angles of the antennas 11 to 14 for vehicle body side signal transmission are 0 degree (a case parallel to the tire rotating axis), and are 70 degrees (a case inclined 70 degrees with respect to the tire rotating axis). Further, the measurement is made by changing the rotation angle of the tire every 10 degrees in a range from 0 degree for locating the signal receiving antenna 36 (i.e., TPS) in a lowest position to 180 degrees for locating the signal receiving antenna 36 in a highest position. In FIG. 3B, the signal receiving level in the case of 0 degree in the attachment angles of the antennas 11 to 14 for vehicle body side signal transmission is set to a reference, and a relative value (dB) of the signal receiving level in the case of 70 degrees in the attachment angles of the antennas 11 to 14 for vehicle body side signal transmission is displayed as an experimental result. In accordance with this experimental result, as shown in FIG. 3B, it is verified that there is a reduction of a signal receiving level of −7.26 dB (about ⅕) even at its minimum in the non-object wheel by changing the above attachment angle from 0 degree to 70 degrees, and the signal receiving level is reversely increased at all the tire angles in the object wheel.

The present invention (the tire monitoring system of the present invention) is not limited to the above mode example, but can be variously modified and applied.

For example, the angles of the coil axes of the antennas 11 to 14 for vehicle body side signal transmission (tire side antennas) may be also perpendicular to the rotating axis of each tire, and may be also set to a state inclined in a reverse direction with respect to the above mode example. The inventors recognize that a similar effect (an effect for preventing the cross talk with respect to the non-object wheel) is obtained in a range of about ±40 degrees from the right angle with respect to the rotating axis of the tire.

Further, "the state of the tire" of the present invention is not limited to the tire pressure, but may be also temperature, distortion, a rotation number, acceleration, etc. of the tire.

The invention claimed is:

1. A tire monitoring system comprising:

a vehicle body side controller able to transmit a wireless signal to each tire through a vehicle body side antenna arranged near each tire in a vehicle in which tires are mounted on both transversal sides orthogonal to a running direction so as to form a pair; and a sensor unit arranged in each tire and measuring a state of each tire and able to transmit information based on its measuring result as a wireless signal, wherein said vehicle body side controller respectively transmits a request signal to each sensor unit through each vehicle body side antenna, and the tire monitoring system has each sensor unit able to receive this request signal through a tire side antenna arranged in each tire;

said vehicle body side antenna and the tire side antenna are constructed by a coil antenna;

said tire side antenna is arranged in each tire such that a coil axis of said tire side antenna approximately becomes parallel to a rotating axis of each tire; and said vehicle body side antenna is arranged near each tire such that no coil axis of said vehicle body side antenna becomes parallel to the rotating axis of each tire.

2. The tire monitoring system according to claim 1, wherein said vehicle body side antenna is arranged above each tire so as to incline the coil axis of said vehicle body side antenna with respect to the rotating axis of each tire; and an inclination direction of the coil axis of said vehicle body side antenna is set so as to incline the coil axis of said vehicle body side antenna on a transversal outside of the vehicle toward a downward direction.

3. The tire monitoring system according to claim 1, wherein a central position of said vehicle body side antenna is arranged outside a central position of said tire side antenna in a transversal direction of the vehicle.

4. The tire monitoring system according to claim 2, wherein a central position of said vehicle body side antenna is arranged outside a central position of said tire side antenna in a transversal direction of the vehicle.

* * * * *